United States Patent [19]  
Hund et al.

[11] 4,443,264
[45] Apr. 17, 1984

[54] HALOGEN-FREE ZINC FERRITE YELLOW PIGMENTS CONTAINING ALUMINA AND PHOSPHORUS OXIDE AND PRODUCTION

[75] Inventors: Franz Hund; Willi Hennings; Horst Brunn; Peter Kresse; Wolfgang Rambold, all of Krefeld, Fed. Rep. of Germany

[73] Assignee: Bayer Aktiengesellschaft, Leverkusen, Fed. Rep. of Germany

[21] Appl. No.: 413,002

[22] Filed: Aug. 30, 1982

[30] Foreign Application Priority Data

Sep. 12, 1981 [DE] Fed. Rep. of Germany ....... 3136276

[51] Int. Cl.³ .............................................. C04B 31/02
[52] U.S. Cl. ................................... 106/292; 106/296; 106/304; 423/594
[58] Field of Search ....................... 106/292, 296, 304; 423/594

[56] References Cited

U.S. PATENT DOCUMENTS

| | | | |
|---|---|---|---|
| 2,683,096 | 7/1954 | Eckert et al. | 428/443 |
| 2,904,395 | 9/1959 | Downs et al. | 423/594 |
| 4,156,613 | 5/1979 | Hund et al. | 106/296 |
| 4,294,808 | 10/1981 | Wasel-Nielen et al. | 106/292 |

FOREIGN PATENT DOCUMENTS

| | | | |
|---|---|---|---|
| 2353620 | 12/1977 | France. | |
| 52-35199 | 3/1977 | Japan | 106/304 |
| 56-95955 | 8/1981 | Japan | 106/296 |

*Primary Examiner*—Helen M. McCarthy
*Attorney, Agent, or Firm*—Sprung, Horn, Kramer & Woods

[57] ABSTRACT

A zinc ferrite pigment comprising, by weight, about 99.8 to 90% of $ZnFe_2O_4$ and about 0.2 to 10% of the component system $(1-x)Al_2O_3$ and $xP_2O_5$ wherein $0 < x < 1$ is produced by calcining a suitable mixture of compounds. The resulting pigments are of high color quality and are substantially halogen-free, rendering them especially useful industrially even as anti-corrosion pigments.

8 Claims, No Drawings

HALOGEN-FREE ZINC FERRITE YELLOW PIGMENTS CONTAINING ALUMINA AND PHOSPHORUS OXIDE AND PRODUCTION

The present invention relates to zinc ferrite pigments having a low halogen content which, in addition to the color-producing component $ZnFe_2O_4$, include the colorless component system $Al_2O_3$ and $P_2O_5$, to a process for producing these pigments and to their use.

Yellow zinc ferrites have been known for some considerable time. Although they may be inexpensively obtained, the products are attended by various disadvantages. Thus, they do not show any particular purity of color. Since they can only be produced by calcining together zinc oxide and iron oxide at temperatures in the range from 750° C. to 1000° C. in the presence of chloride catalysts ($ZnCl_2$, HCl), as described in U.S. Pat. No. 2,904,395, the zinc ferrites thus obtained contain corrosion-promoting quantities of halides.

Accordingly, the object of the present invention is to provide color-pure zinc ferrites which may readily be produced and which, in addition, do not have any of the above-mentioned disadvantages in regard to their practical applications.

Pigments which eminently satisfy all these requirements are zinc ferrites of which about 99.8% to 90% by weight and preferably about 99.5 to 95% by weight based on the weight of the pigment, consists of $ZnFe_2O_4$ and about 0.2 to 10% by weight and preferably about 0.5 to 5% by weight, based on the weight of the pigment, of the component system $(1-x)\ Al_2O_3$ and $xP_2O_5$ where x is greater than zero and less than 1, preferably from about 0.25 to 0.95.

The zinc ferrite pigments according to the invention have halogen contents of less than about 30 ppm.

A simple process has now been found for producing the zinc ferrite pigments according to the invention by calcining together equimolar or substantially equimolar quantities of zinc oxide and iron oxide or starting materials yielding them at temperatures of from about 750° C. to 1000° C. in an oxygen-containing atmosphere, preferably air, characterized in that, after intensive mixing with finely particulate aluminum oxide and/or aluminum phosphates and/or ammonium phosphates and/or free phosphoric acid and/or with components yielding aluminum oxide and/or phosphate on calcination in quantities of from 0.2% to 10.0% by weight and preferably in quantities of from 0.5 to 5.0% by weight, the starting materials—in the form of an aqueous suspension or in the form of a mixture of the solids components—are heated after filtration, washing, sedimentation or concentration by evaporation, normal drying or spray drying or directly in the form of solids after intensive mixing in air or in air enriched or depleted with oxygen or in pure oxygen in the absence of halide catalysts, calcined and the resulting calcine subsequently cooled normally or slowly in the same atmosphere or in an oxygen-enriched atmosphere to temperatures below about 400° C.–500° C. and thereafter, as required, to room temperature.

The insoluble additives in the system $(1-x)\ Al_3O_3$ and $x\ P_2O_5$ may either be added as solids to the aqueous suspension or other suspensions or to the finely particulate solids or they may even be precipitated by the addition of a suitable salt, base or an acid solution at about 0° C. to 100° C. and preferably about 20° C. to 80° C. For example aluminum hydroxides, aluminum oxide hydroxides or aluminum phosphates of various compositions may be precipitated by the addition of hydroxyl ions, meta-, pyro-, ortho- or other phosphate ions or their free acids to aluminum ions or compounds yielding aluminum ions.

Where free phosphoric acids or soluble phosphates are added, it is often best to concentrate the suspensions by evaporation to dryness in order to avoid any losses of phosphate.

The dried and powdered filtered material or the above-mentioned dry powder mixture or the evaporation residue is calcined in air, subsequently cooled and the calcine optionally ground. Instead of being carried out in air, calcination may be carried out in air slightly enriched with oxygen, but especially in oxygen-enriched air to pure oxygen, without the optical properties of the pigments being significantly affected. As usual, there is a reciprocal relationship between the calcination time and the calcination temperature in the sense that calcination generally takes longer at low calcination temperature and is quicker at high temperature.

The pigments according to the invention with their considerable improvement in color quality, with their change from brown-orange-yellow to more lemon-yellow hues, with their higher color saturation and their greater brightness, are a valuable addition to the range of heat-stable, yellow pigments. The pigments may be used for pigmenting building materials, lacquers and dispersion paints, for coloring plastics and paper, for pigmenting ceramics and, in virtue of their low halogen content, even as anti-corrosion pigments.

The invention is illustrated by the following Examples.

EXAMPLES

The examples set out in Table 1 were carried out as follows

In a ¼ mole batch, 20.342 g of ZnO or corresponding quantities of solid, basic zinc carbonate or an industrially produced basic, zinc carbonate suspension and 60.265 g of $Fe_2O_3$ or corresponding quantities of solid $\alpha$-FeOOH, solid $\gamma$-FeOOH, solid $Fe_3O_4$ or industrially produced $\alpha$-$Fe_2O_3$-red,$\alpha$-FeOOH-yellow, $\gamma$-FeOOH-orange and/or $Fe_3O_4$-black suspension are diluted with water to a final volume of 600 ml depending on the viscosity of the suspensions accumulating. It is also possible to mix finely particulate and reactive solids of the above-mentioned components. Also, alkali, ammonium, alkaline-earth metal hydroxide or carbonate may be added to aqueous solutions of zinc and iron(II)- and/or iron(III)-salts corresponding to the above-mentioned quantities of ZnO and $Fe_2O_3$ and the hydroxide, basic or normal carbonates precipitated used as starting material for the zinc ferrite pigments to be produced. In the 1-tests, no additive is introduced into the liquid suspensions or into the powder-air dispersion whereas, in the 2-tests, the type and quantity of additive indicated in Table 1 is introduced and, in every case, the liquid or solid dispersion is intensively mixed for 3 minutes at 6000 r.p.m. in a mixing siren. Thereafter, the aqueous suspension is filtered under suction, washed free from salts with water where soluble salts are present and the filter cake is dried at 105° C. The additives which varied in their composition are shown in Table 1 as percentages of the final pigment. The nature of the solid or liquid additives is characterized by the indication $(1-x)\ Al_2O_3$ and $x\ P_2O_5$ with $0 \leq x \leq 1$. Thus $x=0$ would mean the addition of pure $Al_2O_3$ or compounds yielding it on calcination, $x=0.5$ would mean the compound $AlPO_4$ or compounds yielding it on calcination, $x=0.75$ would mean the compound $Al(PO_3)_3$ or compounds yielding it on calcination and $x=1$ would mean the quantities of any acids of phosphorus or thermally decomposable phosphates corresponding to pure $P_2O_5$.

The dried and powdered filtered material or the above-mentioned dry powder mixture or the evaporation residue is introduced into a platinum or porcelain crucible in quantities of 5 g and then calcined in air for 10 minutes at the temperatures indicated in the individual examples in an electrically heated muffle furnace, cooled in air in the manner indicated and the calcine optionally ground.

The coloristic improvements in the pigments produced in accordance with the invention containing the above-mentioned additive (2) by comparison with the additive-free (1) blank tests treated in otherwise exactly the same way are quantitatively assessed by objective color measurement in color transfers containing organic binders and colored with the ground calcines obtained. Pigment testing is carried out in the air-drying binder Alkydal®F 48 (a product of Bayer AG) using a pigment volume concentration of 10%. To this end, opaque lacquer films are produced from the pigment and binder in a color grinding machine. After drying, the color values are measured in accordance with DIN 53 236, method A, and are converted into the CIELAB, C 2 degree color values according to DIN 6174. For the tests carried out without (1) and with (2) additives, Table 1 shows the color values $H_{degree}$, $C^*$, $L^*$ is measured with a Hunter D 25 Lab. Colour Differenzmeter and subsequently converted and also the differences $\Delta H_{degree}$, $\Delta C^*$ and $\Delta L^*$. In each case, the differences arise from the corresponding values of the additive-free samples (1) which are deducted from the color values of the additive-containing samples (2). For a positive $\Delta H_{degree}$-value, the positive $\Delta$-values of the additive-containing samples, in relation to the additive-free samples represent a desirable change in color from a dull brown-orange yellow to a bright lemon yellow with tinges of green. If the $\Delta C^*$ value is positive, there is an always desirable increase in color saturation and hence an increase in purity of color and, if the $\Delta L^*$-value is positive, there is a desirable increase in the brightness of the color separation which means that a smaller addition of lightening, expensive titanium dioxide pigment is required for obtaining an equally bright separation.

Now, comparison of the tests carried out shows that, in every case, the addition of $(1-x)Al_2O_3$ and x $P_2O_5$ produces improvements in the color values. This is documented here by positive $\Delta H_{degree}$, $\Delta C^*$ and $\Delta^*L$ values of the tests with additives (2) in relation to the additive-free (1) tests carried out in otherwise exactly the same way—so-called blank tests.

Legends to Table 1

S=solid; Sn=suspension; C=concentration of the suspension by evaporation; Pn=precipitation; A.F.=after-precipitation.

1. Basic zinc carbonate suspension
2. $\alpha$-$Fe_2O_3$, finely particulate, precipitated red iron(III) oxide (U.S. Pat. No. 3,946,103).
3. $\alpha$-FeOOH, finely particulate precipitated yellow iron(III) oxide hydroxide (U.S. Pat. No. 1,368,748 or DOS No. 25 56 406) air oxidation process.
4. "Zinkoxid ® aktiv (Active Zinc Oxide ®)", a product of Bayer A.G.
5. $\alpha$-FeOOH, finely particulate, yellow iron(III)oxide hydroxide from the reduction of aromatic nitro compounds by iron in the presence of aluminum salts (German Pat. No. 515,758).
6. $\gamma$-FeOOH, finely particulate yellow-orange iron(III) oxide hydroxide (DAS No. 12 19 009).
7. $Fe_3O_4$, finely particulate, black iron(II)-iron(III)-oxide from the reduction of aromatic nitro compounds by iron in the presence of concentrated iron-(II) salts; German Pat. No. 463,773 or precipitation black (DOS No. 26 18 058 and U.S. Pat. No. 4,090,888)
8. ZnO-"Grünsiegel ® (Green Seal ®)", 99.9%, a product of Grillo A.G.

I=normal cooling in air
II=10 minutes in $O_2$ at 600° C., followed by normal cooling in air
III=5 minutes at 800° C. (in air)+10 minutes at 700° C. (in air)+20 minutes at 600° C. (in air)+20 minutes at 480° C. (in air), followed by normal cooling.
IV=5 minutes at 800° C. (in air)+10 minutes at 700° C. (in air)+10 minutes at 600° C. (in air)+20 minutes at up to 480° C. (in air), followed by normal cooling.
V=5 minutes at 800° C. (in air)+10 minutes at 700° C. (in air)+10 minutes at 600° C. (in air)+30 minutes at 450° C. (in air), followed by normal cooling.

TABLE 1

Production conditions and color values of the zinc ferrite pigments

| Test No. | Components used ZnO | Components used $Fe_2O_3$ | Addition $(1-x)Al_2O_3 + xP_2O_5$ x | % | Calcination °C. | Cooling | Absolute values $H_{degree}$ | Absolute values $C^*$ | Absolute values $L^*$ | difference in relation to blank test $\Delta H_{degree}$ | difference in relation to blank test $\Delta C^*$ | difference in relation to blank test $\Delta L^*$ | Halogen content [ppm] |
|---|---|---|---|---|---|---|---|---|---|---|---|---|---|
| 1.1 | $ZnCO_3$[Sn,[1]] | $\alpha$-$Fe_2O_3$[S,[2]] | none | — | 825 | IV | 54.6 | 36.2 | 44.7 | — | — | — | |
| 1.2 | " | " | x = 0.50[S] | 2 | " | " | 58.2 | 38.5 | 46.9 | +3.6 | +2.3 | +2.2 | |
| 2.1 | $ZnCO_3$[Sn,[1]] | $\alpha$-FeOOH[S,[3]] | none | — | 900 | II | 59.5 | 40.3 | 49.4 | — | — | — | |
| 2.2 | " | " | x = 0.50[S] | 2 | " | " | 62.2 | 41.9 | 51.5 | +2.7 | +1.6 | +2.1 | |
| 3.1 | ZnCO[Sn,[1]] | $\alpha$-FeOOH[Sn,[3]] | none | — | 875 | IV | 62.1 | 42.7 | 51.6 | — | — | — | |
| 3.2 | " | " | x = 0.50[S] | 1 | " | " | 63.2 | 43.1 | 52.7 | +1.1 | +0.4 | +1.1 | — |
| 4.1 | $ZnCO_3$[Sn,[1]] | $\alpha$-FeOOH[Sn,[3]] | none | — | 925 | V | 60.8 | 41.3 | 50.3 | — | — | — | |
| 4.2 | " | " | x = 0.50[S] | 2 | " | " | 63.8 | 43.8 | 52.9 | +3.0 | +2.5 | +2.6 | |
| 5.1 | $ZnCO_3$[S,[4]] | $\alpha$-FeOOH[Sn,[3]] | none | — | 900 | IV | 57.7 | 37.8 | 48.1 | — | — | — | |
| 5.2 | " | " | x = 0.50[S] | 2 | " | " | 62.9 | 42.7 | 51.7 | +5.2 | +4.9 | +3.6 | 20 |
| 6.1 | $ZnCO_3$[Sn,[1]] | $\alpha$-FeOOH[Sn,[3]] | none | — | 850 | III | 60.6 | 41.5 | 50.8 | — | — | — | |
| 6.2 | " | " | x = 0.50[A.F] | 1 | " | " | 61.4 | 42.2 | 51.9 | +0.8 | +0.7 | +1.1 | |
| 7.1 | $ZnCO_3$[S,[4]] | $\alpha$-FeOOH[S,[3]] | none | — | 875 | IV | 58.2 | 37.7 | 48.1 | — | — | — | |
| 7.2 | " | " | x = 0.50[S] | 5 | " | " | 60.6 | 40.3 | 50.5 | +2.4 | +2.6 | +2.4 | |
| 8.1 | $ZnCO_3$[S,[4]] | $\alpha$-FeOOH[S,[3]] | none | — | 875 | IV | 58.1 | 37.7 | 48.1 | — | — | — | |

TABLE 1-continued

Production conditions and color values of the zinc ferrite pigments

| Test No. | Components used ZnO | Fe$_2$O$_3$ | Addition $(1-x)Al_2O_3 + xP_2O_5$ x | % | Calcination °C. | Cooling | Absolute values H$_{degree}$ | C* | L* | difference in relation to blank test ΔH$_{degree}$ | ΔC* | ΔL* | Halogen content [ppm] |
|---|---|---|---|---|---|---|---|---|---|---|---|---|---|
| 8.2 | " | " | x = 0.50[S] | 10 | " | " | 58.2 | 39.6 | 49.6 | +0.1 | +1.9 | +1.5 | |
| 9.1 | ZnCO$_3$[Sn,$^1$] | α-FeOOH[Sn,$^5$] | none | — | 900 | IV | 58.6 | 38.1 | 48.1 | — | — | — | |
| 9.2 | " | " | x = 0.50[S] | 2 | " | " | 64.5 | 43.1 | 52.3 | +5.9 | +5.0 | +4.2 | 10 |
| 10.1 | ZnCO$_3$[Sn,$^1$] | α-FeOOH[Sn,$^5$] | none | — | 850 | I | 58.7 | 36.7 | 47.8 | — | — | — | |
| 10.2 | " | " | x = 0.50[S] | 2 | " | " | 62.8 | 39.4 | 50.3 | +4.1 | +2.7 | +2.5 | |
| 11.1 | ZnCO$_3$[Sn,$^1$] | α-FeOOH[Sn,$^5$] | none | — | 900 | IV | 58.6 | 38.1 | 48.1 | — | — | — | |
| 11.2 | " | " | x = 0.75[S] | 2 | " | " | 63.4 | 42.1 | 51.6 | +4.8 | +4.0 | +3.5 | — |
| 12.1 | ZnCO$_3$[S,$^4$] | γ-FeOOH[S,$^6$] | none | — | 875 | IV | 57.8 | 37.8 | 46.6 | — | — | — | |
| 12.2 | " | " | x = 0.50[S] | 2 | " | " | 59.8 | 39.7 | 48.0 | +2.0 | +1.9 | +1.4 | |
| 13.1 | ZnCO$_3$[Sn,$^1$] | Fe$_3$O$_4$[Sn,$^7$] | none | — | 900 | III | 60.2 | 36.4 | 46.7 | — | — | — | |
| 13.2 | " | " | x = 0.50[S] | 1 | " | " | 62.3 | 36.5 | 47.5 | +2.1 | +0.1 | +0.8 | |
| 14.1 | ZnO[S,$^8$] | α-FeOOH[Sn,$^3$] | none | — | 925 | V | 62.9 | 43.7 | 52.1 | — | — | — | |
| 14.2 | " | " | x = 0.50[S] | 2 | " | " | 65.2 | 45.2 | 53.7 | +2.3 | +1.5 | +1.6 | <10 |
| 15.1 | ZnSO$_4$/Na$_2$CO$_3$ | FeSO$_4$/Na$_2$CO$_3$ | none | — | 875 | IV | 51.6 | 24.7 | 39.7 | — | — | — | |
| | ZnSO$_4$/Na$_2$CO$_3$[Pn] | " | x = 0.50[S] | 2 | " | " | 54.2 | 26.9 | 42.1 | +2.6 | +2.2 | +2.4 | |
| 16.1 | ZnCO$_3$[Sn,$^1$] | α-FeOOH[Sn,$^3$] | none | — | 875 | IV | 57.5 | 38.0 | 47.9 | — | — | — | |
| | " | " | x = 0.33[C] | 2 | " | " | 63.3 | 43.3 | 52.1 | +5.8 | +5.3 | +4.2 | |
| 17.1 | ZnCO$_3$[Sn,$^1$] | α-FeOOH[Sn,$^3$] | none | — | 875 | IV | 57.5 | 38.0 | 47.9 | — | — | — | |
| 17.2 | " | " | x = 0.50[C] | 2 | " | " | 63.1 | 43.3 | 52.0 | +5.6 | +5.3 | +4.2 | 10 |
| 18.1 | ZnCO$_3$[Sn,$^1$] | α-FeOOH[Sn,$^3$] | none | — | 875 | IV | 57.5 | 38.0 | 47.9 | — | — | — | |
| 18.2 | " | " | x = 0.75[C] | 2 | " | " | 62.3 | 42.4 | 51.3 | +4.8 | +4.4 | +3.4 | |
| 19.1 | ZnCO$_3$[Sn,$^1$] | α-FeOOH[Sn,$^3$] | none | — | 875 | IV | 57.5 | 38.0 | 47.9 | — | — | — | |
| 19.2 | " | " | x = 0.83[C] | 2 | " | " | 60.1 | 42.2 | 50.7 | +2.6 | +4.2 | +2.8 | |
| 20.1 | ZnCO$_3$[Sn,$^1$] | α-FeOOH[Sn,$^3$] | none | — | 875 | IV | 57.5 | 38.0 | 47.9 | — | — | — | |
| 20.2 | " | " | x = 0.95[C] | 2 | " | " | 59.8 | 42.0 | 50.7 | +2.3 | +4.0 | +2.8 | |

We claim:

1. A halogen-free zinc ferrite pigment consisting essentially of, by weight, about 99.8 to 90% of ZnFe$_2$O$_4$ and about 0.2 to 10% of the component system $(1-x)Al_2O_3$ and $xP_2O_5$ wherein $0.25 < x < 0.95$.

2. A pigment according to claim 1 comprising, by weight, about 99.5 to 95% of ZnFe$_2$O$_4$ and about 0.5 to 5% of the component system $(1-x)Al_2O_3$ and $xP_2O_5$.

3. An organic binder, plastic, building material, paper, ceramic or anti-corrosion paint pigmented with a pigment according to claim 1.

4. In the production of a halogen-free zinc ferrite pigment by calcining together a mixture of substantially equimolar quantities of zinc oxide and iron oxide or of precursors thereof which yield such oxides upon calcination at about 750° to 1000° C. in an oxygen-containing atmosphere and thereafter cooling, the improvement which consists essentially of adding to the mixture prior to calcination about 0.2 to 10% based on total weight of compounds forming the component system $(1-x)Al_2O_3$ and $xP_2O_5$ wherein $0.25 < x < 0.95$ whereby the resulting pigment is of improved color quality.

5. The process according to claim 4, wherein cooling from calcination temperature down to about 400° to 500° C. is effected slowly in the same atmosphere as during calcination.

6. The process according to claim 4, wherein the compounds forming the component system $(1-x)Al_2O_3$ and $xP_2O_5$ are finely particulate aluminum oxide and/or aluminum phosphates and/or ammonium phosphates and/or free phosphoric acid or compounds yielding them on precipitation, drying and/or calcination.

7. The process according to claim 6, wherein the compounds forming the component system are added to the mixture to be calcined in the form of an aqueous suspension.

8. The process according to claim 6, wherein the compounds forming the component system are solids and intensively mixed with one another and then with the mixture to be calcined.

* * * * *

UNITED STATES PATENT AND TRADEMARK OFFICE
CERTIFICATE OF CORRECTION

PATENT NO. : 4,443,264

DATED : April 17, 1984

INVENTOR(S) : Franz Hund, et al

It is certified that error appears in the above-identified patent and that said Letters Patent is hereby corrected as shown below:

One the title page; 1st page, under "Foreign Application Priority Data"

Delete "3136276" and substitute --3136279.6--

Signed and Sealed this

Ninth Day of July 1985

[SEAL]

Attest:

DONALD J. QUIGG

Attesting Officer

Acting Commissioner of Patents and Trademarks